Figure 1:
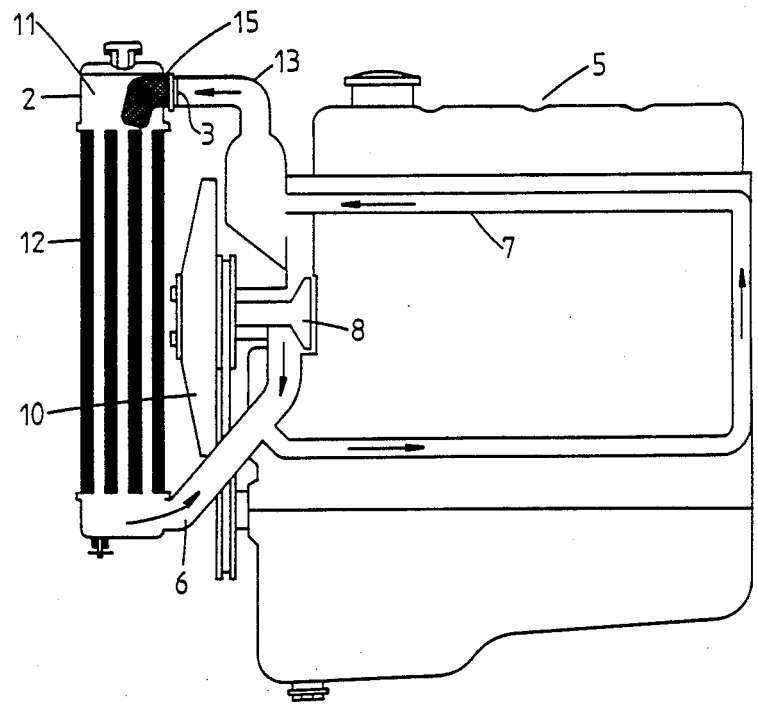

United States Patent [19]

Geermans et al.

[11] Patent Number: 4,743,369

[45] Date of Patent: May 10, 1988

[54] COOLING SYSTEM FILTER

[76] Inventors: Theodore C. Geermans, 19 Roselea St., Caulfield South., Victoria, Australia, 3162; Robert C. Geermans, 13 Glengarry Ave., Burwood, Victoria, Australia, 3125

[21] Appl. No.: 6,675

[22] PCT Filed: Apr. 14, 1986

[86] PCT No.: PCT/AU86/00096
§ 371 Date: Dec. 15, 1986
§ 102(e) Date: Dec. 15, 1986

[87] PCT Pub. No.: WO86/06002
PCT Pub. Date: Oct. 23, 1986

[30] Foreign Application Priority Data

Apr. 15, 1985 [AU] Australia ............... PH00147/85

[51] Int. Cl.[4] ........................................... B01D 29/04
[52] U.S. Cl. ................................... 210/167; 210/233; 210/251; 210/460; 210/496
[58] Field of Search ............ 210/233, 167, 186, 251, 210/460–463, 484, 496, 497.01, 499

[56] References Cited

U.S. PATENT DOCUMENTS

| 3,841,489 | 10/1974 | Combest et al. | 210/223 |
| 3,890,232 | 6/1975 | Combest et al. | 210/223 |
| 3,941,697 | 3/1976 | Johnson | 210/167 |
| 3,960,728 | 6/1976 | Otzen | 210/167 |
| 4,052,308 | 10/1977 | Higgs | 210/167 |
| 4,379,052 | 4/1983 | Stearns | 210/167 X |

Primary Examiner—Tom Wyse
Attorney, Agent, or Firm—Fleit, Jacobson, Cohn & Price

[57] ABSTRACT

A filtering device (15) for use in a cooling system for motors or engines such as for example vehicle or boat engines or alternatively stationary engines having a cooling circuit around which the coolant passes. The device includes a bag-like member (16) which is comprised at least in part by mesh material, the bag-like member, in use, being disposed within the coolant circuit, so that the coolant passes through the mesh material and the bag-like member collects deposits carried by the coolant therein. A magnet (17) may also be provided within the bag-like member. Furthermore, the bag may be stretchable so that the mesh can expand under pressure.

12 Claims, 1 Drawing Sheet

COOLING SYSTEM FILTER

This invention relates generally to filter devices and more particularly, although not exclusively, to devices for filtering the coolant in internal combustion engines Many internal combustion engines include a cooling system in which a coolant such as water is pumped around a circuit which passes adjacent hot sections of the engine and returns to a radiator in which the heat from the water circulating in the cooling system is dissipated. The radiator generally comprises a header tank disposed above a core which comprises a number of tubes in which the heat is dissipated as the water passes through those tubes. Owing to the hot water circulating through the coolant circuit a formation of corrosion and minute deposits of iron rust or corroded aluminium tend to occur. These formations can cause serious problems as they may block up the tubes in the radiator core and therefore reduce the efficiency of the radiator or in some cases prevent the flow of fluid altogether which can lead to serious overheating of the motor.

It is an object of the present invention to provide a filtering device which is suitable for use in the cooling system of an internal combustion engine which assists in inhibiting or reducing the possibility of radiator blockage.

According to the present invention there is provided a filtering device for use in a cooling system for motors or engines such as for example vehicle or boat engines or alternatively stationary engines having a cooling circuit around which the coolant passes, the device including a bag-like member which is comprised at least in part by mesh material, the bag-like member, in use, being disposed within the coolant circuit, so that the coolant passes through said mesh material and so that said bag-like member collects deposits carried by the coolant therein.

Preferably the bag-like member comprises a flexible tube-like element having one end closed and the other end defining a mouth. Preferably the bag-like member is substantially totally formed of mesh material.

The device may further include a magnet which is disposed within the bag-like member and arranged so that it tends to collect metal fines on it as the coolant liquid flows through.

The device is adapted for use in a cooling system for a motor which includes a radiator having an inlet pipe and a header tank. The device may further include means for attachment of the mouth of the bag-like member to the inlet pipe the bag-like member being dimensioned so that it can pass through the inlet pipe into the header tank.

In one preferred form the bag-like member is formed of a stretchable material so that the mesh size of the mesh material can increase in size under pressure. This has the advantage that as the bag fills up with deposits there may be a resistance to flow, however, as pressure builds up the bag can stretch thereby assisting in the passage of coolant therethrough.

Figure 2:
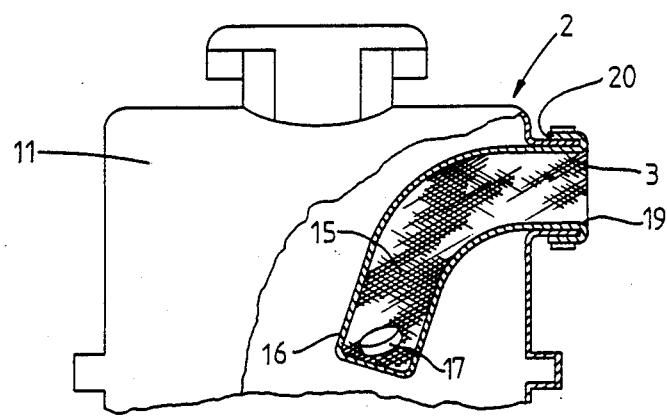

A preferred embodiment of the invention will herein be described with reference to the accompanying drawings in which:

FIG. 1 is a schematic side elevation of the cooling circuit of an internal combustion engine; and FIG. 2 is a more detailed view of FIG. 1 showing the filtering device of the invention.

Referring to the drawings, the filtering device generally indicated at 15 comprises a bag-like member 16 which in the form shown is comprised of a mesh material. The bag-like member, in use, being disposed within the coolant circuit (1) of an internal combustion engine the circuit including a radiator 2 having an inlet pipe 3 connected to the engine 5 and an outlet pipe 6 also connected to the engine 5. The radiator 2 further includes a header tank 11 and a core 12 having a plurality of tubes therein. The coolant is pumped around the current by means of a pump 8 connected to fan 10.

The bag-like member 16 is secured to the inlet pipe 3 of the radiator 2 and is disposed within the upper header tank 11. As shown the bag-like member may be constructed from a flexible tube-like element having one end closed and the other end defining a mouth 19. Any suitable means for attachment of the bag may be used for securing it to the inlet pipe. For example the mouth 19 of the bag may be arranged so that it overlies the inlet end of the pipe 3 and the remainder of the bag being forced through the inlet into the header tank of the radiator. Tape 20 may be used for fastening the bag to the inlet pipe, however, it will be appreciated that other forms of fastenings could be used. The location of the bag-like member as described facilitates ready removal for cleaning or replacement when required.

The size of the mesh-like material may vary depending on the required degree of filtering required. Furthermore any suitable material may be used. In one preferred arrangement stretchable material is used. One particularly suitable mesh material is a double needle bed raschel polyester mesh.

The device of the present invention may further include a magnet 17 which is disposed within the bag-like member 16 and arranged so that it tends to collect the metal fines on it as the coolant liquid flows through the bag. The magnet can be of any suitable size and shape. Thus as the coolant fluid enters the radiator it passes through the filter bag and material collected therein tends to be attracted to the magnet.

It will be appreciated from the foregoing that the filtering device of the present invention provides significant advantages in that the tendency for the radiator to become blocked by fines, rust, scale or other material is inhibited.

To mount the filter device 15 the inlet hose 13 is removed from the inlet pipe 3. The mouth of the bag 16 is arranged over the pipe 3 and held in position by tape 20. The bag 16 is then folded so that it is forced inwardly of the pipe 3 and located within header tank 11. A further piece of tape may be provided for an additional securement of the bag to the inlet pipe 3. When the bag 16 is positioned within the radiator the magnet 17 can be placed in the bag 16 through the inlet pipe 3. The bag 16 is now positioned to collect deposits in the coolant with the extremely fine metal deposits being attracted to the magnet. The bag can be readily removed for cleaning and/or replacement at selected intervals.

What is claimed is:

1. A radiator and filter combination for an engine, the combination comprising a radiator having a header tank and a core which is disposed below said header tank, said core comprising a plurality of tubes, the radiator further including an inlet hose leading to said header tank for delivering coolant to the radiator and an outlet pipe for discharging coolant from the radiator; the combination further comprising an inlet pipe formed on said header tank, a filtering device comprising an elongated tubular flexible bag member which at least in part is formed of a mesh material through which coolant can be filtered, said flexible bag member having an open end and a closed end, said flexible bag member including means for attachment of the open end to the inlet pipe, said flexible bag member extending into the header tank so that the closed end and a major portion of the flexible bag member is disposed within said header tank.

2. The combination of claim 1 wherein said flexible bag member comprises a flexible tube-like element, said open end of said flexible bag member defining a mouth (19).

3. The combination of claim 1 wherein the combination further includes a magnet (17) which is disposed within said flexible bag member and arranged so that it tends to collect metal fines on it as the coolant flows through the flexible bag member.

4. The combination of claim 3 wherein said flexible bag member is substantially totally formed of mesh material.

5. The combination of claim 4 wherein said flexible bag member is formed from a stretchable elastic material so that the mesh material has a mesh size which increases under pressure.

6. The combination of claim 2, said combination further including means for attachment of said mouth of said flexible bag member to said inlet pipe, said flexible bag member being dimensioned so that it can pass through the inlet pipe into the header tank.

7. A radiator and filter combination for an engine comprising:
an upper header tank, said upper header tank including an inlet pipe formed thereon;
a radiatior core connected to and disposed below said upper header tank;
outlet means, said outlet means leading from said radiator core to said engine;
said header tank, said radiator core and said outlet means forming a radiator;
inlet means, said inlet means leading from said engine to said inlet pipe;
means for circulating coolant from said engine through said inlet means to said radiator and for returning said coolant to said engine from said radiator to cool the engine;
a flexible bag-like member disposed between said inlet means and said inlet pipe, said flexible bag-like member having a first closed end and a second open end, said second open end forming a mouth opening into said inlet means;
fastening means for fastening a portion of said flexible bag-like member to said inlet pipe;
said flexible bag-like member passing through said inlet pipe so that said first closed end and a major portion of the flexible bag-like member are disposed within said upper header tank.

8. A radiator and filter combination as defined by claim 7 wherein a magnet is disposed within said major portion of the flexible bag-like member, said magnet attracting fine metal deposits in said coolant to said magnet as said coolant flows through said inlet pipe means and into said upper header tank.

9. A radiator and filter combination as defined by claim 8 wherein said flexible bag-like member is formed of a stretchable elastic material so that the mesh material has a mesh size which increases under pressure.

10. A radiator and filter combination as defined by claim 9 wherein said first closed end of said flexible bag-like member is disposed within said uppper header tank and below said inlet pipe.

11. A radiator and filter combination as defined by claim 7 wherein said portion of said flexible bag-like member overlies an end of said inlet pipe.

12. A radiator and filter combination as defined by claim 11 wherein said portion of said flexible bag-like member is affixed to the exterior of said inlet pipe.

* * * * *